United States Patent
Zhang et al.

(10) Patent No.: US 10,505,890 B2
(45) Date of Patent: Dec. 10, 2019

(54) NETWORK ACCESS METHOD, SYSTEM AND TERMINAL DEVICE, AND COMPUTER STORAGE MEDIUM

(71) Applicant: Sanechips Technology Co., Ltd., Shenzhen, Guangdong (CN)

(72) Inventors: Peirong Zhang, Shenzhen (CN); Quan Sun, Shenzhen (CN); Sheng Shi, Shenzhen (CN); Fengxia Li, Shenzhen (CN); Wei Zhang, Shenzhen (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 291 days.

(21) Appl. No.: 15/505,134

(22) PCT Filed: Nov. 18, 2014

(86) PCT No.: PCT/CN2014/091432
§ 371 (c)(1),
(2) Date: Feb. 20, 2017

(87) PCT Pub. No.: WO2015/117455
PCT Pub. Date: Aug. 13, 2015

(65) Prior Publication Data
US 2017/0310634 A1    Oct. 26, 2017

(30) Foreign Application Priority Data

Aug. 20, 2014 (CN) .......................... 2014 1 0414644

(51) Int. Cl.
*H04L 29/12* (2006.01)

(52) U.S. Cl.
CPC ........ *H04L 61/103* (2013.01); *H04L 61/2015* (2013.01); *H04L 61/6059* (2013.01)

(58) Field of Classification Search
CPC ............... H04L 61/103; H04L 61/2015; H04L 61/6059

(Continued)

(56) References Cited

U.S. PATENT DOCUMENTS

2003/0131133 A1* 7/2003 Nyu ................... H04L 12/66
                                                      709/245
2004/0218614 A1* 11/2004 Yokomitsu ........ H04L 29/12009
                                                      370/401

(Continued)

FOREIGN PATENT DOCUMENTS

CN    201766602 U    3/2011
CN    102572774 A    7/2012

(Continued)

OTHER PUBLICATIONS

International Search Report in international application No. PCT/CN2014/091432, dated May 20, 2015, 2 pgs.

(Continued)

*Primary Examiner* — Chirag R Patel
*Assistant Examiner* — Marshall M McLeod
(74) *Attorney, Agent, or Firm* — Cantor Colburn LLP

(57) ABSTRACT

An embodiment of the present invention relates to a network access method, system and terminal device, and computer storage medium, the method comprising: providing one or more physical network interfaces on a first terminal device; the first terminal device transmits an address resolution protocol (ARP) request to a second terminal device, the second terminal device being connected to the first terminal device via one of the physical network interfaces; if the first terminal device receives a DHCP discovery packet or a router announcement request within a first pre-set time, then the first terminal device accesses an internal network; if the first terminal device receives a router announcement broadcast within the first pre-set time or did not receive a response within the first preset time, then the first terminal device accesses an external network.

13 Claims, 5 Drawing Sheets

(58) Field of Classification Search
USPC .................................. 709/245, 217, 223, 204
See application file for complete search history.

(56) References Cited

U.S. PATENT DOCUMENTS

2014/0215034 A1    7/2014  Chen et al.
2015/0282026 A1*  10/2015  Gupta ................. H04W 72/042
                                                                     370/331

FOREIGN PATENT DOCUMENTS

| CN | 102611750 A | 7/2012 |
| --- | --- | --- |
| CN | 102938940 A | 2/2013 |
| CN | 103167048 A | 6/2013 |
| CN | 103856571 A | 6/2014 |
| CN | 103973468 A | 8/2014 |

OTHER PUBLICATIONS

English Translation of the Written Opinion of the International Search Authority in international application No. PCT/CN2014/091432, dated May 20, 2015, 8 pgs.

* cited by examiner

NETWORK ACCESS METHOD, SYSTEM AND TERMINAL DEVICE, AND COMPUTER STORAGE MEDIUM

TECHNICAL FIELD

The disclosure relates to the field of network communications, and in particular to a network access method, system and terminal device, and a computer storage medium.

BACKGROUND

Along with the rapid development of the Internet, the IP network gradually becomes an essential tool in People's daily work and life. There are a variety of network access manners, but the three access manners of wired broadband, wireless broadband and wireless network are commonly selected by terminal users. And, the wireless network is widely applied to mobile terminal products based on the specific mobility and portability thereof, but since the cost thereof is higher than the fixed-line broadband and the stability is bad, there is relevant switching requirement for terminal users in the fixed-line broadband environment.

In related technology, the internet (external network) and the local area network (internal network) wired access must use different network interfaces, thereby the hardware cost is high, the volume is large, and the user requirement for the mobility and portability cannot be satisfied.

SUMMARY

In view of this, in order to solve currently existing technical problem, the disclosure is provided.

A network access method, wherein a first terminal device is configured with one or more physical network interfaces, the method comprises:

sending, by the first terminal device, an address resolution protocol (ARP) request to a second terminal device connected to the first terminal device through one of the physical network interfaces;

accessing, by the first terminal device, an internal network when receiving a DHCP discovery packet or a router announcement request within a first preset time; and accessing, by the first terminal device, an external network when receiving a router announcement broadcast within the first preset time or not receiving a response information within the first preset time.

Preferably, the method further comprises:

obtaining, by the first terminal device, user configuration information when detecting that the physical network interface has been connected to the second terminal device; and sending, by the first terminal device, the ARP request to the second terminal device when determining that PPPoE dialing configuration information does not exist in the user configuration information.

Preferably, the method further comprises:

accessing, by the first terminal device, the external network through PPPoE dialing when determining that the PPPoE dialing configuration information exists in the user configuration information; and sending, by the first terminal device, the ARP request to the second terminal device when receiving a refuse message within a second preset time, or when not receiving the response message within the second preset time.

Preferably, accessing, by the first terminal device, the internal network when receiving the DHCP discovery packet within the first preset time comprises:

performing, by the first terminal device, a DHCP address assignment interaction with the second terminal device;

accessing, by the first terminal device, the internal network when receiving the router announcement request within the first preset time comprises:

performing, by the first terminal device, an IPv6 address assignment interaction with the second terminal device.

Preferably, accessing, by the first terminal device, the external network when receiving the router announcement broadcast within the first preset time, or not receiving the response information within the first preset time, or not receiving the response information within the second preset time, comprises:

sending, by the first terminal device, the DHCP discovery packet and the router announcement request packet to the second terminal device;

performing, by the first terminal device, the DHCP address assignment interaction with the second terminal device when receiving a response message for the DHCP discovery packet within a third preset time; and performing, by the first terminal device, the IPv6 address assignment interaction with the second terminal device when receiving a response message for the router announcement request packet within the third preset time.

A terminal device comprises a connecting module, a sending module, a first timing module, a receiving module, a connection management module, a first network access module and a second network access module, wherein, the connecting module is configured with one or more physical network interfaces;

the sending module is configured to send an address resolution protocol (ARP) request to a second terminal device connected to the terminal device through one of the physical network interfaces;

the first timing module is configured to begin to time upon the sending module sends the ARP request to the second terminal device, the timed time is a first preset time;

the receiving module is configured to receive a message from the second terminal device;

the connection management module is configured to inform the first network access module to access an internal network when the receiving module receives a DHCP discovery packet or a router announcement request within the first preset time, and inform the second network access module to access an external network when the receiving module receives a router announcement broadcast within the first preset time or does not receive a response information within the first preset time;

the first network access module is configured to access the internal network according to the information of the connection management module; and the second network access module is configured to access the external network according to the information of the connection management module.

Preferably, the terminal device further comprises a user configuration module, the connection management module is further configured to detect whether the physical network interface has been connected to the second terminal device, obtain user configuration information from the user configuration module when detecting that the physical network interface has been connected to the second terminal device; and determine whether PPPoE dialing configuration information exists in the user configuration information;

the user configuration module is configured to maintain the user configuration information; and the sending module is configured to send the ARP request to the second terminal device when the connection management module determines that the PPPoE dialing configuration information does not exist in the user configuration information.

Preferably, the terminal device further comprises a third network access module and a second timing module, the third network access module is configured to access the external network through PPPoE dialing when the connection management module determines that the PPPoE dialing configuration information exists in the user configuration information;

the second timing module is configured to begin to time upon the third network access module initiates accessing the external network through PPPoE dialing, the timed time is a second preset time;

the connection management module is further configured to determine whether the receiving module receives a refuse message or a response message within the second preset time; and the sending module is configured to send the ARP request to the second terminal device when the connection management module determines that the receiving module receives the refuse message within the second preset time, or does not receive the response message within the second preset time.

Preferably, the first network access module is configured to perform a DHCP address assignment interaction with the second terminal device when the receiving module receives the DHCP discovery packet within the first preset time, and perform an IPv6 address assignment interaction with the second terminal device when the receiving module receives the router announcement request within the first preset time.

Preferably, the terminal device further comprises a third timing module, the sending module is configured to send the DHCP discovery packet and the router announcement request packet to the second terminal device when the connection management module determines that the receiving module receives the router announcement broadcast within the first preset time, or does not receive the response information within the first preset time, or does not receive the response information within the second preset time;

the third timing module is configured to begin to time upon the sending module sends the DHCP discovery packet and the router announcement request packet to the second terminal device, the timed time is a third preset time;

the connection management module is further configured to determine whether the receiving module receives a response message for the DHCP discovery packet or the router announcement request packet within the third preset time; and the second network access module is configured to perform the DHCP address assignment interaction with the second terminal device when the connection management module determines that the receiving module receives the response message for the DHCP discovery packet within the third preset time, and perform the IPv6 address assignment interaction with the second terminal device when the response message for the router announcement request packet is received within the third preset time.

A network access system comprises a first terminal device configured with a physical network interface and a second terminal device, wherein the first terminal device is the terminal device as described above.

A computer storage medium stores computer executable instructions for executing the method as described above.

The disclosure provides a network access method, system and terminal device, and a computer storage medium. A first terminal device is configured with one or more physical network interfaces, the first terminal device sends an address resolution protocol (ARP) request to a second terminal device, the second terminal device is connected to the first terminal device through one of the physical network interfaces; if a DHCP discovery packet or a router announcement request is received by the first terminal device within a first preset time, then an internal network is accessed; if a router announcement broadcast is received by the first terminal device within the first preset time or a response information is not received within the first preset time, then an external network is accessed. The disclosure enables a single physical network interface to adapt to the internal and external network access through physical network interface multiplexing, and reduces the hardware cost and terminal product volume of related network communications products.

DETAILED DESCRIPTION

In order to overcome the currently existing technical problem that the internet and the local area network wired access must use different network interfaces, the disclosure provides a network access method and device in which the internal and external network multiplex a single physical network interface, thereby realizing the function of accessing the local area network and the internet simultaneously.

Figure 1:
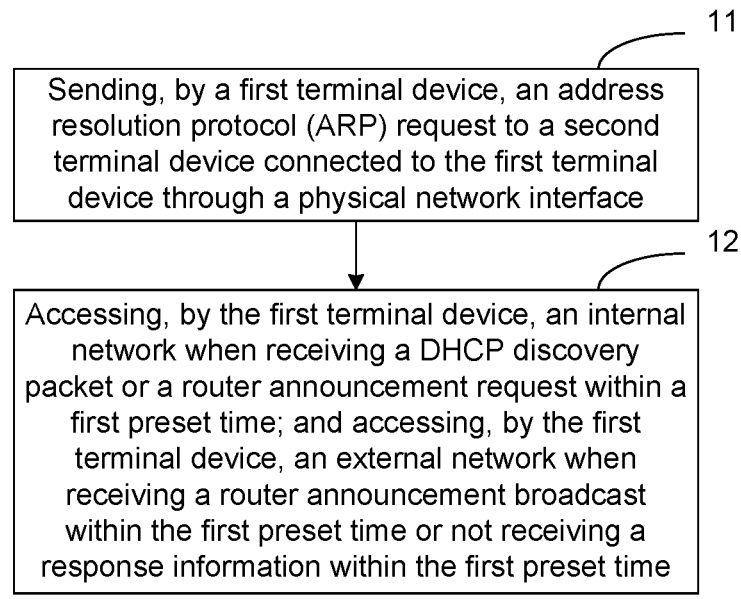
FIG. 1 is a flowchart of a network access method according to an embodiment of the disclosure.

FIG. 1 is a flowchart of a network access method according to an embodiment of the disclosure, as shown in FIG. 1, the method includes:

Step 11: sending, by a first terminal device, an address resolution protocol (ARP) request to a second terminal device, the second terminal device is connected to the first terminal device through a physical network interface;

In the embodiment, the first terminal is configured with one or more physical network interfaces so as to connect a plurality of terminal devices simultaneously, with the function of each physical network interface being the same. Herein, the second terminal device is connected to the first terminal device through one of the physical network interfaces;

Step 12: accessing, by the first terminal device, an internal network when receiving a DHCP discovery packet or a router announcement request within a first preset time; accessing, by the first terminal device, an external network when receiving a router announcement broadcast within the first preset time or not receiving a response information within the first preset time.

In an embodiment of the disclosure, the method further includes:

obtaining, by the first terminal device, user configuration information when the first terminal device detects that the physical network interface has been connected to the second terminal device;

sending, by the first terminal device, the ARP request to the second terminal device when the first terminal device determines that no PPPoE dialing configuration information exists in the user configuration information.

In an embodiment of the disclosure, the method further includes:

accessing, by the first terminal device, the external network through PPPoE dialing when the first terminal device determines that the PPPoE dialing configuration information exists in the user configuration information; and sending, by the first terminal device, the ARP request to the second terminal device when receiving a refuse message within a second preset time, or not receiving the response message within the second preset time.

In an embodiment of the disclosure, accessing, by the first terminal device, the internal network when receiving the DHCP discovery packet within the first preset time includes:

performing, by the first terminal device, a DHCP address assignment interaction with the second terminal device;

accessing, by the first terminal device, the internal network when receiving the router announcement request within the first preset time includes:

performing, by the first terminal device, an IPv6 address assignment interaction with the second terminal device.

In an embodiment of the disclosure, accessing, by the first terminal device, the external network when receiving the router announcement broadcast within the first preset time or not receiving the response information within the first preset time, or not receiving the response information within the second preset time includes:

sending, by the first terminal device, the DHCP discovery packet and the router announcement request packet to the second terminal device;

performing, by the first terminal device, the DHCP address assignment interaction with the second terminal device when receiving a response message for the DHCP discovery packet within a third preset time; performing, by the first terminal device, the IPv6 address assignment interaction with the second terminal device when receiving a response message for the router announcement request packet within the third preset time.

Figure 2:
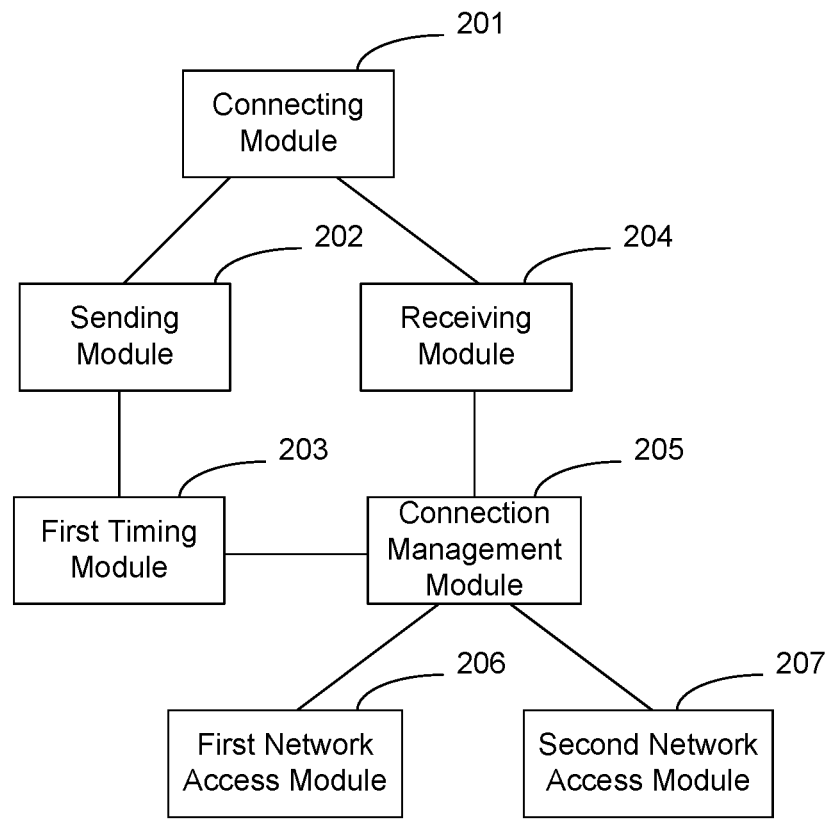
FIG. 2 is a structural diagram of a terminal device according to an embodiment of the disclosure.

The disclosure further provides a terminal device, as shown in FIG. 2, which includes: a connecting module 201, a sending module 202, a first timing module 203, a receiving module 204, a connection management module 205, a first network access module 206 and a second network access module 207; wherein, the connecting module 201 is configured with one or more physical network interfaces;

the sending module 202 is configured to send a ARP request to a second terminal device, the second terminal device is connected to the terminal device through one of the physical network interfaces;

the first timing module 203 is configured to begin to time upon the ARP request is sent to the second terminal device by the sending module, and the timed time is a first preset time;

the receiving module 204 is configured to receive a message from the second terminal device;

the connection management module 205 is configured to inform the first network access module to access an internal network when a DHCP discovery packet or a router announcement request is received by the receiving module 204 within the first preset time; inform the second network access module to access an external network when the receiving module receives a router announcement broadcast within the first preset time or does not receive a response information is within the first preset time;

the first network access module 206 is configured to access the internal network according to the information of the connection management module 205; specifically, the first network access module 206 is responsible for allocating an IP address, which means allocating an IP address to the local area network; and the second network access module 207 is configured to access the external network according to the information of the connection management module 205; specifically, the second network access module 207 is responsible for obtaining IP address, which means obtaining an IP address from an internet server.

Figure 3:
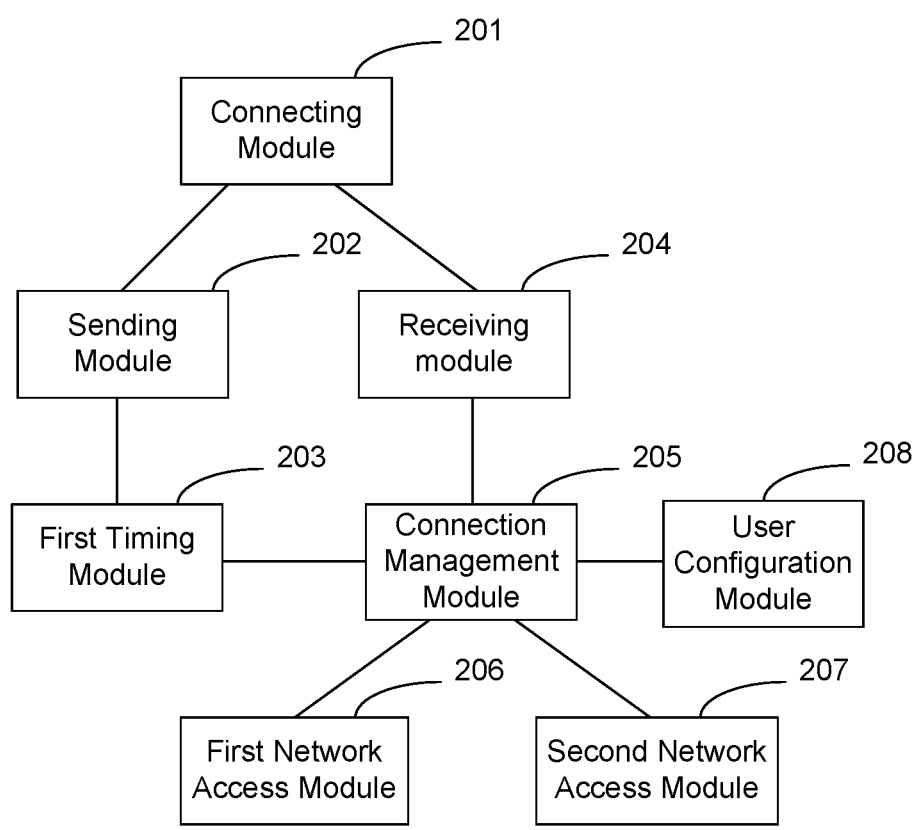
FIG. 3 is a structural diagram of another terminal device according to an embodiment of the disclosure.

In an embodiment of the disclosure, as shown in FIG. 3, the terminal device further includes: a user configuration module 208, the connection management module 205 is further configured to detect whether the physical network interface has been connected to the second terminal device, obtain user configuration information from the user configuration module when detecting that the physical network interface has been connected to the second terminal device; and determine whether PPPoE dialing configuration information exists in the user configuration information;

the user configuration module 208 is configured to maintain the user configuration information; and the sending module 202 is configured to send the ARP request to the second terminal device when the connection management module 205 determines that the PPPoE dialing configuration information does not exist in the user configuration information.

Figure 4:
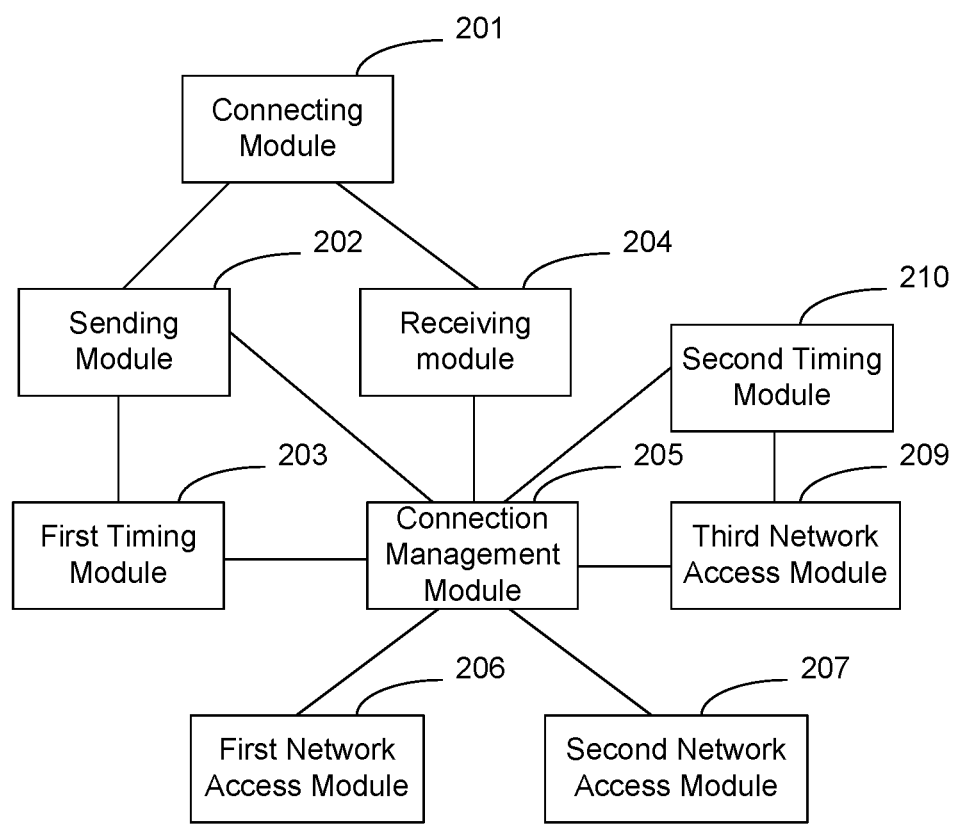
FIG. 4 is a structural diagram of another terminal device according to an embodiment of the disclosure.

In an embodiment of the disclosure, as shown in FIG. 4, the terminal device further includes: a third network access module 209 and a second timing module 210;

the third network access module 209 is configured to access the external network through PPPoE dialing when the connection management module 205 determines that the PPPoE dialing configuration information exists in the user configuration information;

the second timing module 210 is configured to begin to time upon the third network access module 209 initiates accessing the external network through PPPoE dialing, and the timed time is a second preset time;

the connection management module 205 is further configured to determine whether a refuse message or a response message is received by the receiving module 204 within the second preset time; and the sending module 202 is configured to send the ARP request to the second terminal device when the connection management module 205 determines that the receiving module 204 receives the refuse message within the second preset time, or does not receive the response message within the second preset time.

In an embodiment of the disclosure, the first network access module 203 is configured to perform a DHCP address assignment interaction with the second terminal device when the DHCP discovery packet is received by the receiving module within the first preset time; and perform an IPv6 address assignment interaction with the second terminal device when the router announcement request is received by the receiving module within the first preset time.

Figure 5:
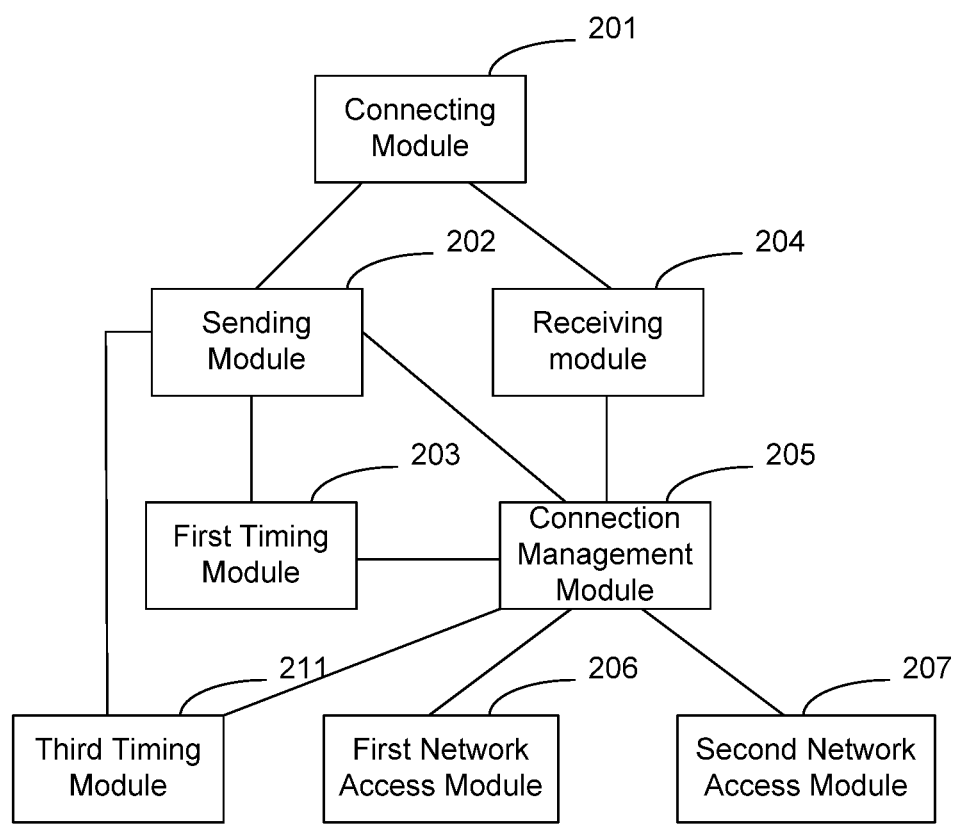
FIG. 5 is a structural diagram of another terminal device according to an embodiment of the disclosure.

In an embodiment of the disclosure, as shown in FIG. 5, the terminal device further includes: a third timing module 211, the sending module 202 is further configured to send the DHCP discovery packet and the router announcement request packet to the second terminal device when the connection management module 205 determines that the receiving module 204 receives the router announcement broadcast within the first preset time or does not receive the response information within the first preset time, or does not receive the response information within the second preset time;

the third timing module 211 is configured to begin to time upon the sending module 202 sends the DHCP discovery packet and the router announcement request packet to the second terminal device, and the timed time is a third preset time;

the connection management module 205 is further configured to determine whether a response message for the DHCP discovery packet or the router announcement request packet is received by the receiving module 204 within the third preset time; and the second network access module 207 is configured to perform the DHCP address assignment interaction with the second terminal device when the connection management module 205 determines that the receiving module 204 receives the response message for the DHCP discovery packet within the third preset time; perform the IPv6 address assignment interaction with the second terminal device when the response message for the router announcement request packet is received within the third preset time.

According to the above description, the sending module is mainly responsible for sending data packets of the ARP request response, address assignment and obtaining etc.; the receiving module is mainly responsible for receiving data packets of the ARP request response, address assignment and obtaining etc. The third network access module finishes PPPoE dialing according to a PPPoE protocol, and allocates an IP address to the terminal; the first network access module allocates IP address to the local area network according to the DHCP, DHCPv6 and ICMPv6 protocols; and the second network access module obtains an IP address from the internet server according to the DHCP, DHCPv6 and ICMPv6 protocols.

The disclosure further provides a network access system, including: a first terminal device configured with a physical network interface, and a second terminal device; wherein, the first terminal device is the above terminal device (terminal device as shown in any one of FIGS. 2-5).

The disclosure further provides a computer storage medium storing computer executable instructions for executing the method in any one of the embodiments.

The technical solution of the disclosure is further described below with reference to a specific embodiment.

Embodiment 1

In the embodiment, there are four kinds of processing modes:

Mode 1: when the user configuration is in a PPPoE dialing manner, executing PPPoE dialing is directly performed and it is confirmed that the internet is accessed if the dial successes;

Mode 2: it is confirmed that currently the local area network is accessed when the DHCP discovery packet or the router announcement request is received, an IP address assignment module allocates the IP address to the access device;

Mode 3: the DHCP discovery packet and the router announcement request are sent if the DHCP discovery packet or the router announcement request is not received, waiting for the peer response, and it is confirmed that the internet is accessed when the response is correct, and then entering into an IP address obtaining module to request to configure an IP address of the local terminal;

Mode 4: other network connection manners defined by users, including, but not limited to, a fixed IP connection, a PPP dial etc.;

It is noted that the processing orders of these modes can be changed randomly without affecting the function of the subject matter of the method.

Figure 6:
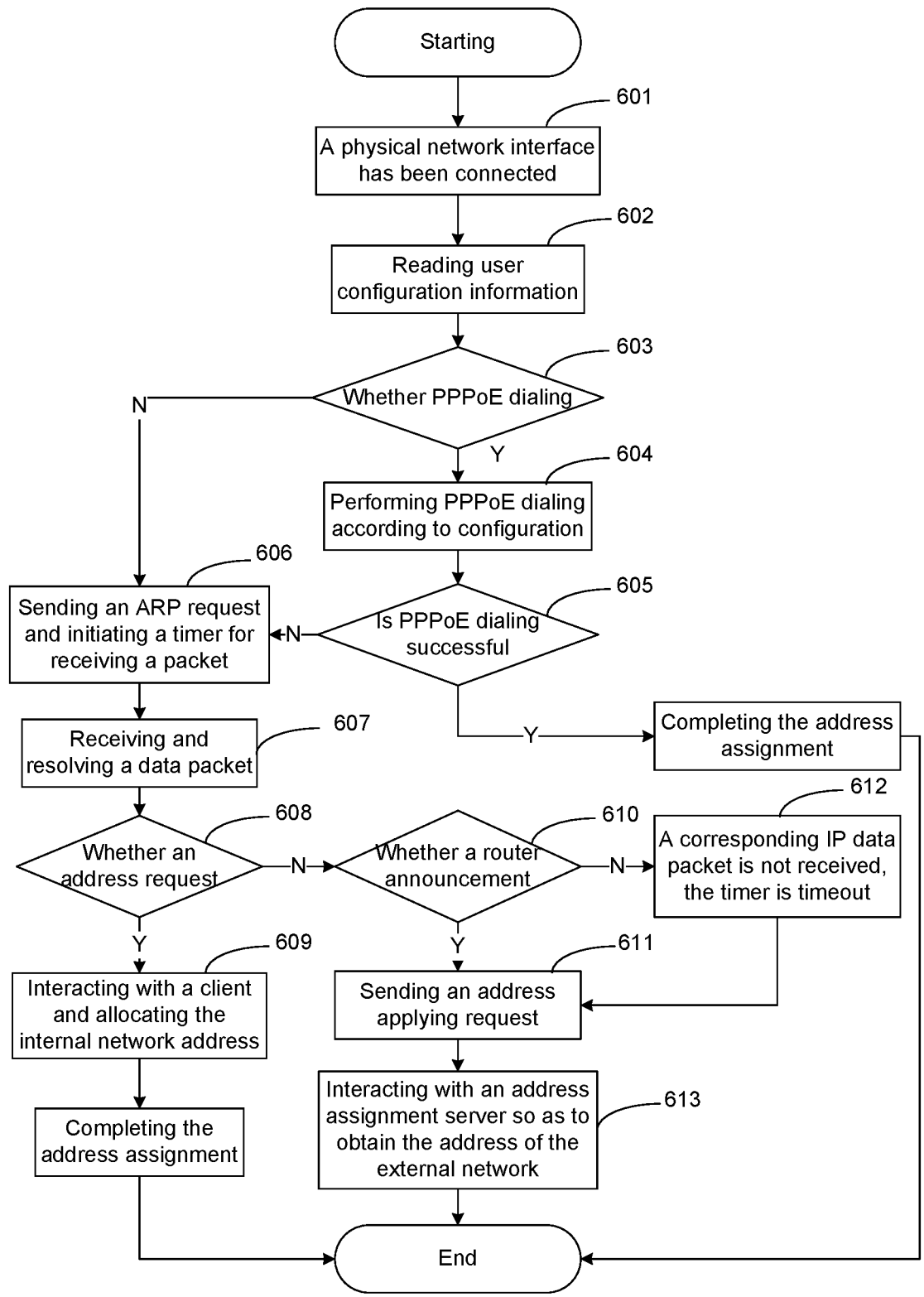
FIG. 6 is a flowchart of a network access method according to the embodiment 1 of the disclosure.

FIG. 6 is a flowchart of a network access method according to the embodiment 1 of the disclosure, as shown in FIG. 6, the method includes:

Step 601: detecting that the physical network interface has been connected;

Step 602: reading user configuration information;

Step 603: determining whether PPPoE dialing configuration information is included in the user configuration information, entering step 604 if yes, entering step 606 if not;

Step 604: performing PPPoE dialing according to the configuration;

Step 605: determining whether PPPoE is successful, and finishing the process if yes; otherwise, entering step 606;

Step 606: sending the ARP request and starting a timer for receiving a packet;

Step 607: receiving a data packet and resolving the data packet;

Step 608: determining whether the received data packet is an address request (the DHCP discovery packet or the router announcement request packet), and entering step 609 if yes; otherwise, entering step 610;

Step 609: interacting with the access client, allocating the internal network address and finishing the process.

Here, the DHCP address assignment (IPv4 address assignment) interaction is performed if the DHCP discovery packet is received, and the IPv6 address assignment interaction is performed if the router announcement request packet is received.

Step 610: determining whether the received data packet is the router announcement, and entering step 611 if yes; otherwise, entering step 612;

Step 611: sending an address applying request, and turning to step 613.

Here, that is sending the DHCP discovery packet and the router announcement request packet.

Step 612: turning to step 611 when corresponding IP data packet is not received or the timer is timeout;

Step 613: interacting with an address assignment server so as to obtain the address of the external network.

Here, if the PC responses to the DHCP discovery, then the DHCP address request interaction is performed, and if the PC responses to the router announcement, then the IPv6 address request is performed, and the process is finished.

It is noted that if other non-PPPoE dialing access configuration information is set in the user configuration information, then the network is accessed directly according to the access configuration information.

It is noted that the disclosure can be applied to all kinds of network devices or modules configured with a physical network interface, including, but not limited to, a mobile router, a wireless charger etc.

The method and device of the disclosure, compared with prior art, control the mobile terminal volume, reduce the hardware cost and enhance the device compatibility and expansibility.

The modules described above may be realized by a central processing unit (CPU), a digital signal processor (DSP) or a field-programmable gate array (FPGA) in an electronic equipment.

Those skilled in the art should understand that the embodiments of the disclosure can be provided as a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided to a general computer, a dedicated computer, an embedded processor or processors of other programmable data processing devices to generate a machine, so that an apparatus for realizing functions specified in one or more flows of the flowcharts and/or one or more blocks of the block diagrams is generated by instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above description is only the preferred embodiments of the disclosure, and does not intent to limit the protection scope of the disclosure.

What is claimed is:

1. A network access method, wherein a first terminal device is configured with one or more physical network interfaces, the method comprising:
   sending, by the first terminal device, an address resolution protocol (ARP) request to a second terminal device connected to the first terminal device through one of the physical network interfaces; and
   accessing, by the first terminal device, an internal network when receiving a DHCP discovery packet or a router announcement request within a first preset time; and
   accessing, by the first terminal device, an external network when receiving a router announcement broadcast within the first preset time or not receiving a response information within the first preset time,
   the method further comprises:
   obtaining, by the first terminal device, user configuration information when detecting that the physical network interface has been connected to the second terminal device; and
   sending, by the first terminal device, the ARP request to the second terminal device when determining that PPPoE dialing configuration information does not exist in the user configuration information.

2. The method according to claim 1, further comprising:
   accessing, by the first terminal device, the external network through PPPoE dialing when determining that the PPPoE dialing configuration information exists in the user configuration information; and
   sending, by the first terminal device, the ARP request to the second terminal device when receiving a refuse message within a second preset time, or when not receiving the response message within the second preset time.

3. The method according to claim 1, wherein,
   accessing, by the first terminal device, the internal network when receiving the DHCP discovery packet within the first preset time, comprising:
   performing, by the first terminal device, a DHCP address assignment interaction with the second terminal device;
   accessing, by the first terminal device, the internal network when receiving the router announcement request within the first preset time, comprising:
   performing, by the first terminal device, an IPv6 address assignment interaction with the second terminal device.

4. The method according to claim 1, wherein accessing, by the first terminal device, the external network when receiving the router announcement broadcast within the first preset time, or not receiving the response information within the first preset time comprising:
   sending, by the first terminal device, the DHCP discovery packet and the router announcement request packet to the second terminal device;
   performing, by the first terminal device, the DHCP address assignment interaction with the second terminal device when receiving a response message for the DHCP discovery packet within a third preset time; and
   performing, by the first terminal device, the IPv6 address assignment interaction with the second terminal device when receiving a response message for the router announcement request packet within the third preset time.

5. A terminal device comprising a processor and a memory for storing instructions executable by the processor; wherein the processor is configured to implement a connecting module, a sending module, a first timing module, a receiving module, a connection management module, a first network access module and a second network access module, wherein,
   the connecting module is configured with one or more physical network interfaces;
   the sending module is configured to send an address resolution protocol (ARP) request to a second terminal device connected to the terminal device through one of the physical network interfaces;
   the first timing module is configured to begin to time upon the sending module sends the ARP request to the second terminal device, the timed time is a first preset time;

the receiving module is configured to receive a message from the second terminal device;

the connection management module is configured to inform the first network access module to access an internal network when the receiving module receives a DHCP discovery packet or a router announcement request within the first preset time, and inform the second network access module to access an external network when the receiving module receives a router announcement broadcast within the first preset time or does not receive a response information within the first preset time;

the first network access module is configured to access the internal network according to the information of the connection management module; and the second network access module is configured to access the external network according to the information of the connection management module, wherein the processor is further configured to implement a user configuration module, the connection management module is further configured to detect whether the physical network interface has been connected to the second terminal device, obtain user configuration information from the user configuration module when detecting that the physical network interface has been connected to the second terminal device; and determine whether PPPoE dialing configuration information exists in the user configuration information;

the user configuration module is configured to maintain the user configuration information; and the sending module is configured to send the ARP request to the second terminal device when the connection management module determines that the PPPoE dialing configuration information does not exist in the user configuration information.

6. The terminal device according to claim 5, the processor is further configured to implement a third network access module and a second timing module, the third network access module is configured to access the external network through PPPoE dialing when the connection management module determines that the PPPoE dialing configuration information exists in the user configuration information;

the second timing module is configured to begin to time upon the third network access module initiates accessing the external network through PPPoE dialing, the timed time is a second preset time;

the connection management module is further configured to determine whether the receiving module receives a refuse message or a response message within the second preset time; and the sending module is configured to send the ARP request to the second terminal device when the connection management module determines that the receiving module receives the refuse message within the second preset time, or does not receive the response message within the second preset time.

7. The terminal device according to claim 5, wherein, the first network access module is configured to perform a DHCP address assignment interaction with the second terminal device when the receiving module receives the DHCP discovery packet within the first preset time, and perform an IPv6 address assignment interaction with the second terminal device when the receiving module receives the router announcement request within the first preset time.

8. The terminal device according to claim 6, the processor is further configured to implement a third timing module, the sending module is configured to send the DHCP discovery packet and the router announcement request packet to the second terminal device when the connection management module determines that the receiving module receives the router announcement broadcast within the first preset time, or does not receive the response information within the first preset time, or does not receive the response information within the second preset time;

the third timing module is configured to begin to time upon the sending module sends the DHCP discovery packet and the router announcement request packet to the second terminal device, the timed time is a third preset time;

the connection management module is further configured to determine whether the receiving module receives a response message for the DHCP discovery packet or the router announcement request packet within the third preset time; and the second network access module is configured to perform the DHCP address assignment interaction with the second terminal device when the connection management module determines that the receiving module receives the response message for the DHCP discovery packet within the third preset time, and perform the IPv6 address assignment interaction with the second terminal device when the response message for the router announcement request packet is received within the third preset time.

9. A network access system comprising a first terminal device configured with a physical network interface and a second terminal device, wherein the first terminal device is the terminal device according to claim 5.

10. A non-transitory computer storage medium storing computer executable instructions for executing the method according to claim 1.

11. The method according to claim 2, wherein, accessing, by the first terminal device, the internal network when receiving the DHCP discovery packet within the first preset time, comprising:

performing, by the first terminal device, a DHCP address assignment interaction with the second terminal device;

accessing, by the first terminal device, the internal network when receiving the router announcement request within the first preset time, comprising:

performing, by the first terminal device, an IPv6 address assignment interaction with the second terminal device.

12. The method according to claim 2, wherein accessing, by the first terminal device, the external network when not receiving the response information within the second preset time, comprising:

sending, by the first terminal device, the DHCP discovery packet and the router announcement request packet to the second terminal device;

performing, by the first terminal device, the DHCP address assignment interaction with the second terminal device when receiving a response message for the DHCP discovery packet within a third preset time; and performing, by the first terminal device, the IPv6 address assignment interaction with the second terminal device when receiving a response message for the router announcement request packet within the third preset time.

13. The terminal device according to claim 6, wherein, the first network access module is configured to perform a DHCP address assignment interaction with the second terminal device when the receiving module receives the DHCP discovery packet within the first preset time, and perform an IPv6 address assignment interaction with the second terminal device when the receiving module receives the router announcement request within the first preset time.

* * * * *